United States Patent
Nawathe

(10) Patent No.: US 11,550,848 B2
(45) Date of Patent: Jan. 10, 2023

(54) QUERY PROCESSING USING MATRIX AND REDUCED PREDICATE STATEMENTS

(71) Applicant: ADOBE INC., San Jose, CA (US)

(72) Inventor: Sandeep Nawathe, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 145 days.

(21) Appl. No.: 16/777,405

(22) Filed: Jan. 30, 2020

(65) Prior Publication Data

US 2021/0240780 A1    Aug. 5, 2021

(51) Int. Cl.
    G06F 16/903    (2019.01)
    G06F 17/16     (2006.01)
    G06F 16/901    (2019.01)

(52) U.S. Cl.
    CPC .... *G06F 16/90335* (2019.01); *G06F 16/9027* (2019.01); *G06F 17/16* (2013.01)

(58) Field of Classification Search
    CPC . G06F 16/90335; G06F 16/9027; G06F 17/16
    See application file for complete search history.

(56) References Cited

U.S. PATENT DOCUMENTS

| | | | |
|---|---|---|---|
| 7,917,501 B2 | 3/2011 | Arends et al. |
| 8,296,748 B2 | 10/2012 | Cheng et al. |
| 8,738,608 B2 | 5/2014 | Pauly |
| 9,110,946 B2 | 8/2015 | Chen et al. |
| 9,378,239 B1 | 6/2016 | Long et al. |
| 9,378,241 B1 | 6/2016 | Shankar et al. |
| 9,535,963 B1 | 1/2017 | Shankar et al. |
| 2005/0091183 A1 | 4/2005 | Cunningham et al. |
| 2008/0288442 A1 | 11/2008 | Feigenbaum et al. |

(Continued)

OTHER PUBLICATIONS

Mohan, C., et al., "Single Table Access Using Multiple Indexes: Optimization, Execution, and Concurrency Control Techniques", International Conference on Extending Database Technology EDBT 1990: Advances in Database Technology—EDBT '90, pp. 29-43 (1990).

(Continued)

*Primary Examiner* — Hosain T Alam
*Assistant Examiner* — Anthony G Gemignani
(74) *Attorney, Agent, or Firm* — Shook, Hardy & Bacon LLP

(57) ABSTRACT

A query processing system applies transforms to convert a collection of predicate statements to two parts, a matrix and a set of reduced predicate statements, and evaluates the matrix and reduced predicate statements when querying data. The query processing system applies the transforms to extract conjunctive predicates or disjunctive predicates from the predicate statements to provide the set of reduced predicate statements and generates the matrix using the extracted conjunctive predicates or disjunctive predicates. When data is received for querying, the query processing system evaluates the matrix and reduced predicate statements for the data to provide search results. The query processing system may first identify candidate predicate statements that may be satisfied for the data from the matrix and then evaluates the reduced predicate statements for those candidate predicate statements.

19 Claims, 6 Drawing Sheets

(56) References Cited

U.S. PATENT DOCUMENTS

| | | |
|---|---|---|
| 2008/0306910 A1* | 12/2008 | Singh .................... G06F 16/832 |
| 2009/0063397 A1 | 3/2009 | Beavin et al. |
| 2011/0016109 A1 | 1/2011 | Vassilvitskii et al. |
| 2011/0078134 A1 | 3/2011 | Bendel et al. |
| 2011/0213660 A1 | 9/2011 | Fontoura et al. |
| 2011/0252073 A1 | 10/2011 | Pauly |
| 2012/0054225 A1 | 3/2012 | Marwah et al. |
| 2012/0089594 A1 | 4/2012 | Krishna et al. |
| 2012/0173517 A1 | 7/2012 | Lang et al. |
| 2013/0262498 A1* | 10/2013 | Chen .................... G06F 16/2453 707/765 |
| 2014/0156587 A1 | 6/2014 | Momtchev et al. |
| 2014/0317115 A1 | 10/2014 | Pauly |
| 2014/0358894 A1* | 12/2014 | Wei .................... G06F 16/2453 707/713 |
| 2014/0379690 A1 | 12/2014 | Ahmed et al. |
| 2015/0032763 A1 | 1/2015 | Marwah et al. |
| 2015/0234888 A1* | 8/2015 | Ahmed ............. G06F 16/24535 707/765 |
| 2015/0356140 A1 | 12/2015 | Demir |
| 2017/0075898 A1 | 3/2017 | Deshpande et al. |
| 2017/0075984 A1 | 3/2017 | Deshpande et al. |
| 2017/0083571 A1 | 3/2017 | Shankar et al. |
| 2018/0285475 A1 | 10/2018 | Grover et al. |
| 2019/0253254 A1 | 8/2019 | Brownlee et al. |
| 2019/0332698 A1 | 10/2019 | Cho et al. |
| 2020/0004736 A1 | 1/2020 | Liu et al. |
| 2020/0134032 A1 | 4/2020 | Liu et al. |
| 2020/0341981 A1 | 10/2020 | Fender et al. |

OTHER PUBLICATIONS

Non-Final Office Action dated Aug. 19, 2021 in U.S. Appl. No. 16/777,399, 18 pages.
Preinterview first office action dated Oct. 6, 2021 in U.S. Appl. No. 16/777,412, 4 pages.
First Action Interview dated Nov. 29, 2021 in U.S. Appl. No. 16/777,412, 04 pages.
Notice of Allowance dated Feb. 2, 2022 in U.S. Appl. No. 16/777,399, 13 pages.
Final Office Action dated Apr. 28, 2022 in U.S. Appl. No. 16/777,412, 38 pages.
Notice of Allowance dated Aug. 10, 2022 in U.S. Appl. No. 16/777,412, 14 pages.

* cited by examiner

US 11,550,848 B2

QUERY PROCESSING USING MATRIX AND REDUCED PREDICATE STATEMENTS

CROSS-REFERENCE TO RELATED APPLICATIONS

This patent application is related by subject matter to: U.S. patent application Ser. No. 16/777,412, titled QUERY PROCESSING USING HYBRID INVERTED INDEX OF PREDICATES, filed on even date herewith; and U.S. patent application Ser. No. 16/777,399, titled QUERY PROCESSING USING INVERTED INDEX OF PREDICATE STATEMENTS , filed on even date herewith. Each of the aforementioned applications is incorporated herein by reference in its entirety.

BACKGROUND

As the amount of available digital information continues to grow exponentially, search techniques have become paramount for quickly and efficiently querying information. For some domains, query processing is performed by expressing queries using a set of predicate statements and evaluating the predicate statements for data being queried. In some cases, tens of thousands of predicate statements are generated by machine learning that need to be evaluated at run time. Given the large number of evaluations that need to be performed, it is an expensive operation in terms of processing requirements for conventional query processing systems to completely and accurately perform these evaluations and difficult for the conventional query processing systems to return results in an acceptable amount of time.

SUMMARY

Embodiments of the present invention relate to, among other things, a query processing system that applies transforms to convert a collection of predicate statements to two parts, a matrix and a set of reduced predicate statements, and evaluates the matrix and reduced predicate statements when querying data. The query processing system applies the transforms to extract conjunctive predicates or disjunctive predicates from the predicate statements to provide the set of reduced predicate statements and generates the matrix using the extracted conjunctive predicates or disjunctive predicates. When data is received for querying, the query processing system evaluates the matrix and reduced predicate statements for the data to provide search results. The query processing system may first identify candidate predicate statements that may be satisfied for the data from the matrix and then evaluates the reduced predicate statements for those candidate predicate statements. The transforms applied by the query processing system are idempotent such that results of evaluation of data using the matrix and reduced predicate statements are identical to results of evaluation of the data using the original predicate statements.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Definitions

Figure 1:
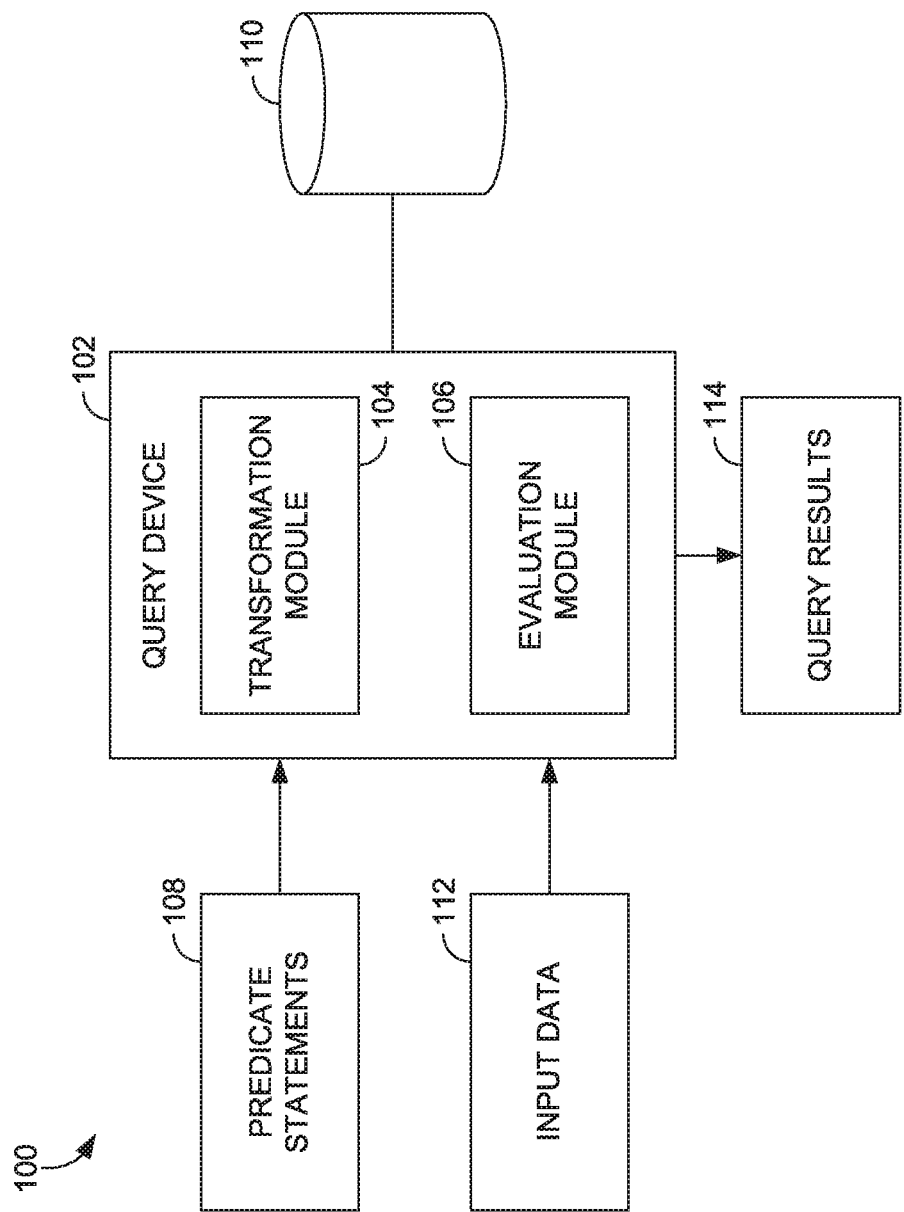
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, a "predicate" refers to a condition to be evaluated as either "true" when the condition is satisfied or "false" when the condition is not satisfied. A predicate can generally be represented as: LHS OPERATOR RHS, where LHS refers to a left-hand side that is a "variable," RHS refers to a right-hand side that is a "predicate value" that can be a constant or a predicate value for the variable, and OPERATOR refers a "predicate operator" for comparing the LHS and RHS. Predicator operators includes: $<$, $<=$, $=$, $!=$, $>$, and $>=$. Shown below are a few examples of predicates to illustrate:

1) $r<=10$, where "r" is a variable, $<=$ is an operator, and 10 is a predicate value that is a constant.
2) state='CA', where "state" is a variable, $=$ is an operator, and 'CA' is a predicate value that is a constant.
3) $x>y$, where "x" is a variable, $>$ is an operator, and "y" is a predicate value that is a variable.

A "predicate statement" joins individual predicates using logical operators, which may be Boolean operators, such as AND, OR, and NOT. Provided below is an example of a predicate statement combining the above predicates (parenthesis are included to assist in readability):

(($r<=10$) OR ($x>y$)) AND (state='CA')

As used herein, a "predicate statement identifier" refers to an identifier assigned to a predicate statement to uniquely identify the predicate statement. For instance, the predicate statement identifier assigned to each predicate statement from a collection of predicate statements can be a sequential number.

A "predicate statement tree" or "tree" is a tree expression of a predicate statement in which each leaf node corresponds with a predicate from the predicate statement and each intermediate node corresponds with a logical operator from the predicate statement.

A "node identifier" refers to an identifier assigned to each predicate and each logical operator in a predicate statement.

A "predicate identifier" refers to an identifier that uniquely identifies a predicate in a collection of predicate statements. In some configurations, a predicate identifier used to uniquely identify a predicate can be a combination of a predicate statement identifier for the predicate statement containing the predicate and the node identifier assigned to the predicate.

As used herein, "conjunctive normal form" (CNF) for a predicate statement indicates that the predicate statement is expressed as a conjunction (i.e., logical AND) of several predicate subexpressions where each predicate subexpression is devoid of any conjunction operator. Below is an example of a predicate statement in CNF:
(r<=10 OR x<y) AND (state='CA')

In this example, the predicate statement includes two predicate subexpressions: (r<=10 OR x<y) and (state='CA'), and each subexpression is devoid of any conjunction operator.

As used herein, "disjunctive normal form" (DNF) for a predicate statement indicates that the predicate statement is expressed as a disjunction (i.e., logical OR) of several predicate subexpressions where each predicate subexpression is devoid of any disjunction operator. Below is an example of a predicate statement in DNF:
(a<10 AND score>0.9) OR (state='CA' AND gender='Male')

In this example, the predicate statement includes two predicate subexpressions: (a<10 AND score>0.9) and (state='CA' AND gender='Male'), and each subexpression is devoid of any disjunction operator.

OVERVIEW

Query processing for many domains is often accomplished by conventional query processing systems expressing queries using a set of predicate statements and evaluating the predicate statements against data being queried. Each predicate statement includes one or more predicates, and each predicate represents a condition to be evaluated. The goal of such query processing systems is to provide evaluations that are accurate, complete, and performed in a short period of time (e.g., a few milliseconds). Although each predicate statement can be sequentially evaluated for a truth value, when a large number of predicate statements are involved, the evaluation process can be both resource and time intensive for the query processing system. Some approaches, such as the RETE algorithm, have been developed to facilitate the evaluation process but still include drawbacks in resource requirements (including processing and memory requirements) and the time required for the query processing systems to process the queries.

Embodiments of the present invention are directed to a query processing system that addresses these challenges by providing a solution that efficiently evaluates predicate statements for query processing. Given a collection of predicate statements, the query processing system applies one or more transforms to convert the predicates statements into two parts: (1) a matrix, and (2) a set of reduced predicate statements. The transforms applied are idempotent in that results of evaluation of data using the matrix and reduced predicate statements is identical to results of evaluation of the data using the original predicate statements.

The transforms applied to predicate statements operate to extract conjunctive predicates (when the predicate statements are in CNF) or disjunctive predicates (when the predicate statements are in DNF) from the predicate statements to form the reduced predicate statements. The matrix is generated by including a row for each predicate statement and a column for each variable included in the predicate statements. Each conjunctive/disjunctive predicate extracted from the predicate statements are added to the matrix in the row for the predicate statement from which the conjunctive/disjunctive predicate was extracted and in the column for the variable included in the conjunctive/disjunctive predicate.

When input data is to be queried, the query processing system evaluates the matrix and set of reduced predicate statements for the input data. In some configurations, the query processing system initially identifies which predicate statements can be satisfied for the input data from the matrix. These are considered as candidate predicate statements. The reduced predicate statements for the candidate predicate statements are then evaluated for the input data. For each reduced predicate statement that evaluates to true based on the input data, the corresponding predicate statement is marked as true, thereby providing a result set of predicate statements that evaluate to true for the input data.

The query processing system described herein provides a number of advantages over conventional systems. Due to the regular structure of the matrix, evaluation to identify candidate predicate statements from the matrix can be performed very quickly and efficiently. For instance, in the case of conjunctive predicates, the process is a simple ANDing of the conjunctive predicates. Additionally, the reduced predicate statements have lower complexity as compared to the original predicate statements, making evaluation of those reduced predicate statements quicker and more efficient. Further, reduced predicate statements are evaluated only for candidate predicate statements identified from the matrix. This is in contrast to conventional systems in which each predicate statement is evaluated. Accordingly, the query processing system provides for evaluation of predicate statements that is not only faster than conventional systems but also more efficient, thereby reducing computing resources requirements to perform query processing.

Query System Using Transformed Predicate Statements

With reference now to the drawings, FIG. 1 is a block diagram illustrating an exemplary system 100 for query data by transforming a collection of predicate statements into matrix and reduced expression form in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes query device 102, which includes a transformation module 104, and an evaluation module 106. The query device 102 shown in FIG. 1 can comprise a computer device, such as the computing device 600 of FIG. 6, discussed below. While the query device 102 is shown as a single device in FIG. 1, it should be understood that the query device 102 may comprise multiple devices cooperating in a distributed environment. For instance, the query device 102 could be provided by multiple server devices collectively providing the functionality of the query device 102 as described herein. Additionally, other components not shown may also be included within the network environment. When multiple devices are employed, the devices can communicate via a network (not shown), which may include, without limitation, one or more local area networks (LANs) and/or wide area networks (WANs). Such networking environments are commonplace in offices, enterprise-wide computer networks, intranets, and the Internet. It should be understood that any number of devices and networks may be employed within the system 100 within the scope of the present invention.

At a high level, the query device 102 generally operates to transform a collection of predicate statements 108 into a matrix and reduced predicate statement form, which is used for evaluating the predicate statements when querying input data. Among other components not shown, the query device includes a transformation module 104 and evaluation module 106.

The transformation module 104 operates to transform the collection of predicate statements 108 into a matrix and reduced predicate statement form. One approach for the transformation module 104 to transform predicate statements is described in more detail below with reference to FIG. 3. Initially, the transformation module 104 may perform one or more preprocessing operations on the predicate statements 108. For instance, the transformation module 104 may convert at least a portion of the predications statements 108 into CNF or DNF such that each predicate statement is in CNF or DNF.

The preprocessing operations may further include assigning a predicate statement identifier to each predicate statement from the collection of predicate statements 108. Additionally, for each predicate statement, the transformation module 104 may assign a node identifier to each predicate and each logical operator. In some configurations, this may include representing the predicate statement as tree with each leaf node corresponding to a predicate and each intermediate node corresponding to a logical operator. The edges between nodes in the tree are structured based on the relationships among predicates and logical operators in the predicate statement. A combination of a predicate statement identifier and node identifier can be used to uniquely identify predicates and logical operators among the collection of predicate statements 108. For instance, a predicate identifier uniquely identifying a predicate can be based on a combination of a predicate statement identifier for the predicate statement in which the predicate is located and a node identifier for the predicate.

Figure 2:
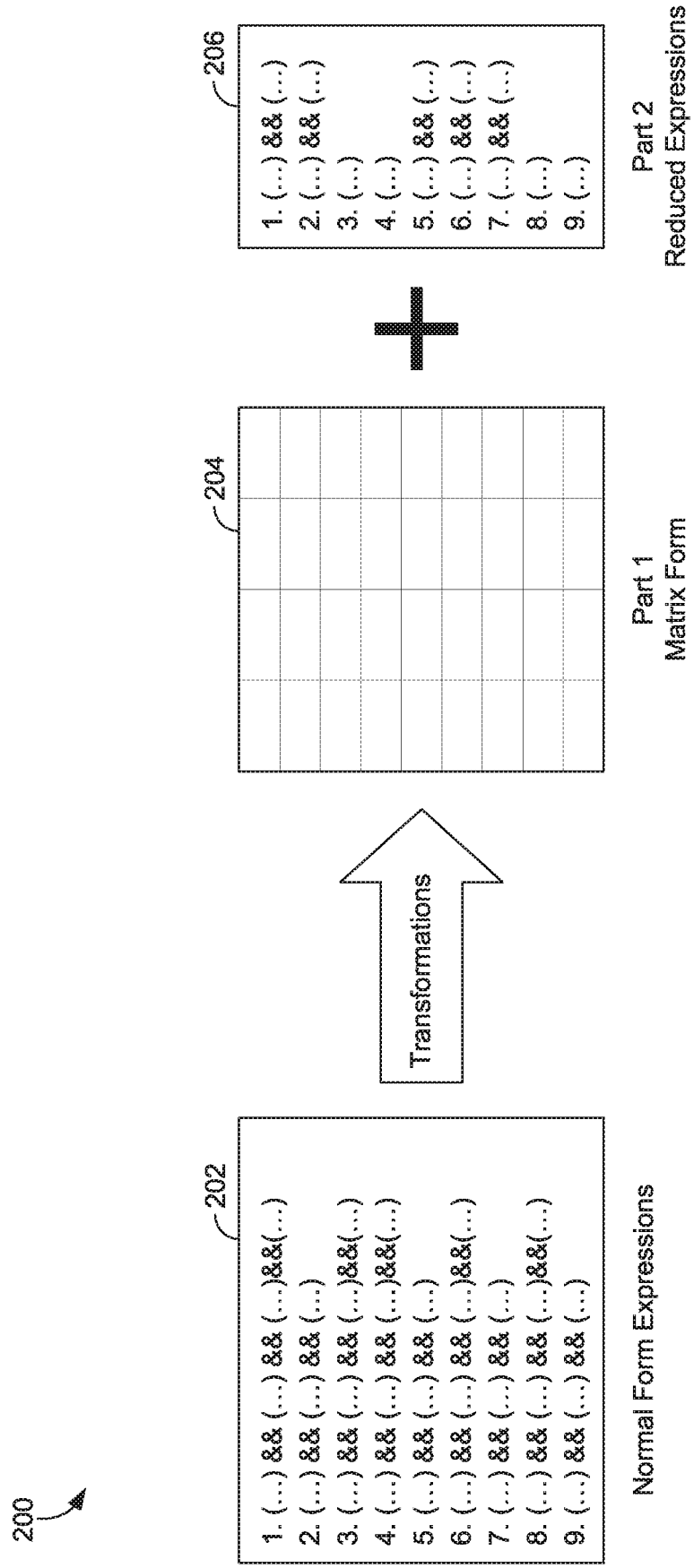
FIG. 2 is a block diagram showing transformation of a collection of predicate statements to a matrix and reduced predicate statement form in accordance with some implementations of the present disclosure.

After any preprocessing is performed, the transformation module 104 performs one or more idempotent transformations on the predicate statements 108 to convert the predicate statements to two parts: a first part comprising a matrix and a second part comprising a reduced predicate statement for each predicate statement from the collection of predicate statements. This transformation is illustrated in FIG. 2, in which a collection of predicate statements 202 is transformed into a matrix 204 and a set of reduced predicate statements 206.

In instances in which the predicate statements 108 are in CNF, the transformation module 104 applies transformations to generate a matrix containing conjunctive predicates from each predicate statement. Each row of the matrix corresponds with a predicate statement and each column corresponds with a variable. Each conjunctive predicate from a predicate statement is added to the row for the predicate statement and the column based on the variable of the predicate statement. Additionally, the transformations provide a reduced predicate statement for each predicate statement by removing any conjunctive predicates added to the matrix from a predicate statement. In instances in which the predicate statements are in DNF, the transformation module 104 applies transformations to generate a matrix containing disjunctive predicates from each predicate statement and reduced predicate statements in which disjunctive predicates added to the matrix have been removed from the predicate statements.

The evaluation module 106 employs the matrix and reduced predication statement form generated by the transformation module 104 to evaluate predicate statements for input data 112 in order to provide query results 114. One approach for the evaluation module 106 to evaluate predicate statements for input data are described in detail below with reference to FIG. 5.

In accordance with some configurations, the evaluation module 106 first employs the matrix to identify candidate predicate statements that can be satisfied for the input data. More particularly, each conjunctive predicate or disjunctive predicate in the matrix for a given predicate statement is evaluated for the input data. If satisfied for a given predicate statement, the predicate statement is considered a candidate for further evaluation. Otherwise, if unsatisfied for a given predicate statement, the predicate statement is not further evaluated.

The evaluation module 106 evaluates the reduced predicate statement for each candidate predicate statement identified from the matrix. For each reduced predicate statement that evaluates to true based on the input data, the corresponding predicate statement is marked as true, thereby providing a result set of predicate statements that evaluate to true for the input data, and query results 114 are provided based on this evaluation process.

Predicate Statement Transformation

Figure 3:
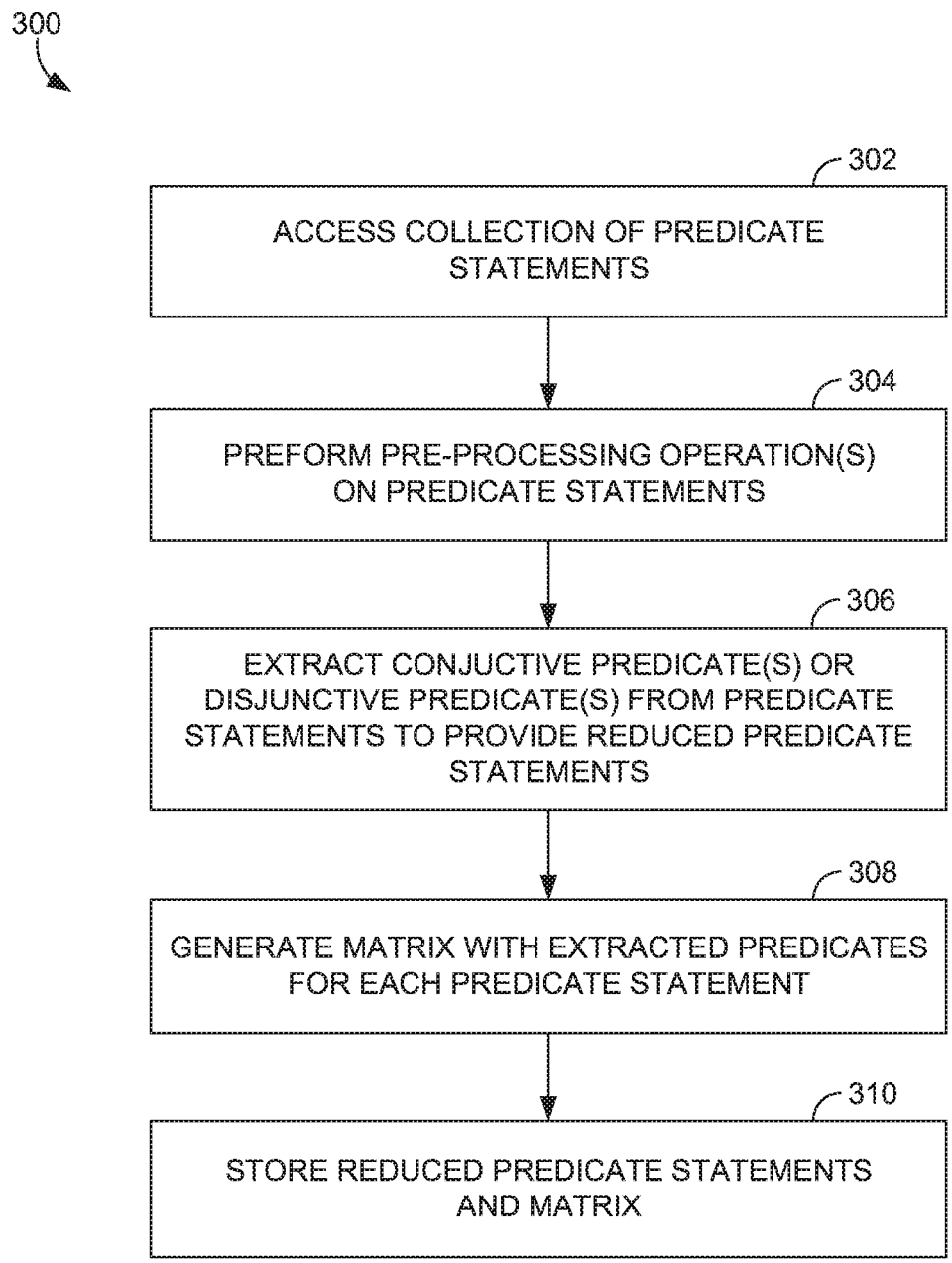
FIG. 3 is a flow diagram showing a method for transforming a collection of predicate statements in accordance with some implementations of the present disclosure.

With reference now to FIG. 3, a flow diagram is provided that illustrates a method 300 for transforming a collection of predicate statements. The method 300 may be performed, for instance, by the transformation module 104 of FIG. 1. The method 300 may be performed for each predicate statement in a collection of predicate statements to be evaluated. Each block of the method 300 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 302, a collection of predicate statements are accessed. The collection of predicate statements generally comprises expressions that are used for querying data. The predicate statements can comprise multiple predicates, for instance, of the form (A OP $a_1$) where, OP$\in\{=, \neq, <, \leq, >, \geq, =\sim\}$ and A is the variable which may take values $a_1, a_2 \ldots$ from the range of predicate values corresponding to the predicate A. This domain may be referred to herein as the dimension $d^A$ of the attribute A, and D can be used to denote the set of all dimensions such that, D=$\{d^A, d^B, d^C \ldots\}$ $pe_i$ is used to denote a single predicate statement, and PE is used to denote the set of all predicate statements such that, PE=$\{pe_1, pe_2, \ldots\}$. The range of values (RHS of a predicate) used by a $pe_i$ for a dimension $d^A$ is denoted as $R^A$. When evaluating predicate statements, the predicate evaluation function for predicate A under assignment of a single value $a_i$ is denoted as A.eval($a_i$). The function returns either true or false.

One or more preprocessing operations are performed on the collection of predicate statements, as shown at block 304. For instance, the one or more preprocessing operations may include converting predicate statements to CNF or DNF. Various configurations of the present technology operate on the collection of predicate statements with all predicate statements either in CNF or DNF. In some instances, some or all of the predicate statements in the collection of predicate statements may not be in this form. Accordingly, in such instances, at least a portion of the predicate statements are converted to CNF or DNF such at all predicate statements are in CNF or DNF. The process may employ any known algorithm to convert a set of arbitrary predicate statements to either CNF or DNF.

The preprocessing operations may also include assigning a predicate statement identifier to each predicate statement. This allows each predicate statement to be uniquely identified using its predicate statement identifier. In some configurations, each predicate statement is assigned a sequential number as its predicate statement identifier. However, it should be understood that other approaches for assigning predicate statement identifiers to predicates statements may be employed within the scope of the technology described herein.

The preprocessing operations may further include representing each predicate statement is represented as a tree. To represent a predicate statement as a tree, each predicate from the predicate statement is represented as a leaf node, and each logical operator from the predicate is represented as an intermediate node. In some configurations, predicate operators that are negations of the type '!=' are converted to NOT and '='. This eliminates negations from leaf nodes. Relationships between the nodes in the tree are based on the relationship of the operators and predicates within the predicate statement.

Each node in the predicate statement may also be assigned a node identifier. In some configurations, the nodes of the tree are numbered using a depth first walk of the tree. This may include sequentially assigning consecutive numbers to each node. However, it should be understood that any other number scheme may be used within the scope of the technology described herein. The node identifier for a predicate serves to uniquely identify each predicate within that predicate statement. Each predicate can be uniquely identified within a collection of predicate statements as a combination of the predicate statement identifier for the predicate statement of the predicate and the predicate identifier for the predicate. Thus, a combination of a predicate statement identifier and node identifier serve as a predicate identifier to uniquely identify a predicate within a collection of predicate statements.

Figure 4:
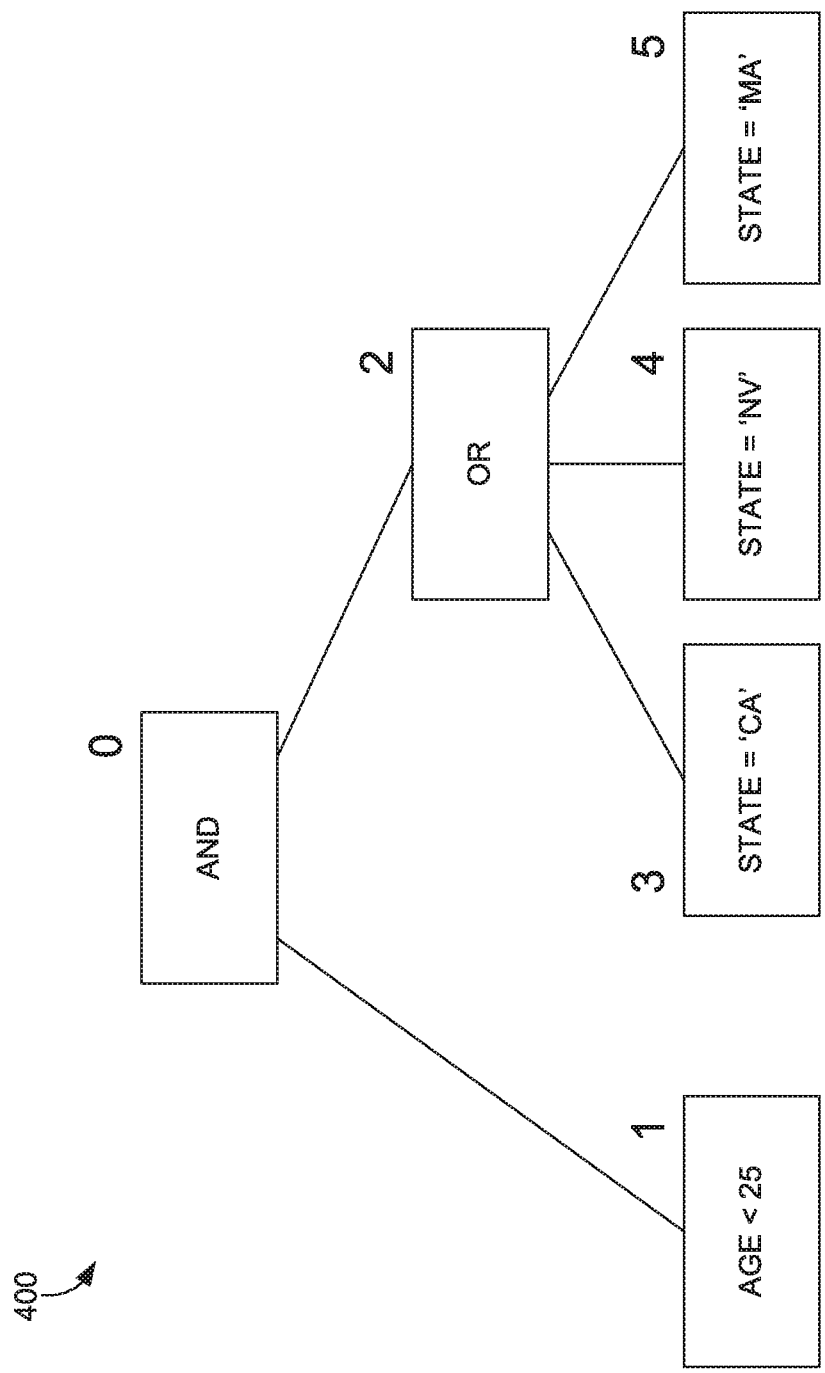
FIG. 4 is block diagram showing an example of a tree generated from a predicate statement.

FIG. 4 provides an example of a tree 400 generated from the predicate statement, which is in CNF:

Example pe: (age<25) AND (state='CA' OR state='NV' OR state='MA')

As can be seen in FIG. 4, each predicate from this example predicate statement is represented as a leaf node in the tree 400 and each logical operator is represented as an intermediate node in the tree 400, with the relationships among the nodes based on the relationships among the predicate statements and logical operators in the predicate statement. As also shown in FIG. 4, each node has been assigned a node identifier using a depth first walk of the tree using consecutive numbers and starting with zero.

Returning to FIG. 3, for each predicate statement, one or more conjunctive predicates or one or more disjunctive predicates are extracted from the predicate statement to provide a reduced predicate statements, as shown at block 306. In instances in which the predicate statements are in CNF, conjunctive predicates are extracted. In instances in which the predicate statements are in DNF, disjunctive predicates are extracted. A predicate is identified as a conjunctive predicate in a predicate statement if none of the ancestors of the predicate in the tree expression for the predicate statement are a disjunction. In the example predicate statement used to generate the tree 300 of FIG. 3, the predicate with the variable "age" is a conjunctive predicate, while the predicates with the variable "state" are not conjunctive predicates. Conversely, a predicate is identified as a disjunctive predicate in a predicate statement if none of the ancestors of the predicate in the tree expression for the predicate statement are a conjunction.

A matrix is generated that includes, for each predicate statement, the one or more conjunctive predicates statements or the one or more disjunctive predicates extracted from the predicate statement, as shown at block 308. The matrix may comprise a simple tabular structure that is initialized with one row for each predicate statements and one column for each unique variable found in the collection of predicate statements. As shown at block 310, the reduced predicate statements and matrix are stored on one or more computer storage media, such that they can be used to evaluation the predicate statements for querying data.

Any number of transforms may be applied to each predicate statement in order to extract conjunctive predicates or disjunctive predicates to generate the matrix and reduced predicate statements. The transforms may be idempotent, such that evaluation of the matrix and reduced predicate statement form provide identical results to the evaluation of the original predicate statements. Below are examples of transforms that may be applied to predicate statements in CNF. While the examples below focus on predicate statements in CNF, similar transforms can be applied to predicate statements in DNF. It should be understood the transforms described below are provided by way of example only and not limitation. None, some, or all of the transforms described herein may be used in various configurations, while other transforms not described may also be employed. Any and all variations are contemplated to be within the scope of the technology described herein.

Transform 1: If a single subexpression within CNF has multiple disjunctions that belong to a common variable, then the disjunctions of the common variable are consolidated as a single predicate and disjunctions are removed. In the Example pe used above to generate the tree 400 of FIG. 4, the second clause has multiple disjunctions with same variable "state." This is replaced by a single predicate as shown below:

(state='CA' OR state='NV' OR state='MA') (state=['CA', 'NV', 'MA']

Thus, the Example pe transforms to:

(age<25) AND state=['CA', 'NV', 'MA'])

If the result of this transform makes the transformed predicate a conjunctive predicate, then it is marked as a conjunctive predicate. In the above example, both the predicate with the "age" variable and the predicate with the "state" variable are conjunctive predicates.

Transform 2: If a CNF has subclauses that are simple predicates of a common variable and use the inequality operator, then the simple predicates of the common variable are consolidated as a single predicate with the inequality operator. By way of example to illustrate:

(age>35 AND country !='CANADA' AND country !='USA')→
(age>35 AND country !=['CANADA', 'USA'])

If the result of this transform makes the transformed predicate a conjunctive predicate, then it is marked as a conjunctive predicate. In the above example, both the predicate with the "age" variable and the predicate with the "country" variable are conjunctive predicates.

Transform 3: If a given predicate statement $pe_i$ does not have any conjunctive predicate for a given variable, then the predicate statement $pe_i$ is augmented with a conjunctive predicate (attribute=Ø), where Ø is a phantom value that is considered always present during evaluation such that (attribute=Ø) is always true. The newly added predicate is marked as a conjunctive predicate. For example, take the following predicate statement:

$pe_i$: (A=$a_1$) AND (B=$b_1$ OR C=$c_1$)

The above example predicate statement $pe_i$ does not have conjunctive predicates for variables B and C. Therefore, the predicate statement $pe_i$ is transformed as follows:

$pe_i$: (A=$a_1$) AND (B=$b_1$ OR C=$c_1$) AND (B=Ø) AND (C=Ø)

As a result of transforms 1, 2, and 3 each predicate statement has at least one conjunctive predicate in each dimension.

Transform 4: For each variable of a predicate statement, a most complex conjunctive predicate is selected. Predicate complexity can be considered, for instance, from high to low in the following order:

Predicates transformed in Transform 2; example: (country !=['CANADA', 'USX'])
Predicates transformed in Transform 1; example: (state=['CA', 'NV', 'MA'])
Simple Predicates; example: (age>25)

If multiple conjunctive predicates of a predicate statement have the same highest complexity, then one can be selected at random. The selected predicate for each variable is added to the matrix. For instance, each row in the matrix corresponds with a predicate statement and is identified by a predicate statement identifier and each column corresponds with a variable. The selected predicate for a variable in a predicate is added to the cell matched by predicate identifier: variable as row: column respectively. As an optimization, if the selected predicate is a phantom value predicate, then the cell in the matrix is changed to true. Additionally, the selected predicate removed from the original predicate statement is replaced by the truth value "true." As an example to illustrate:

$pe_i$: (A=$a_1$) AND (B=$b_1$ OR C=$c_1$) AND (B=Ø) AND (C=Ø)
$pe_i$: true AND (B=$b_1$ OR C=$c_1$) AND true AND true Since the removed conjunctive predicates are replaced in this step by true. The resultant expression is equivalent to:
⇒$pe_i$: True AND (B=$b_1$ OR C=$c_1$)

As an optimization, Transform 3, in which conjunctive predicates are added with a phantom value (variable=Ø) for variables that don't have conjunctive predicates in predicate statements, can be omitted. Instead, the truth value "true" can be identified in the matrix for any variable that does not have a conjunctive predicate in a predicate statement.

Transform 5: Each predicate statement $pe_i$ is modified with an addition of a new conjunctive predicate (CJ=$pe_i$), where CJ is a new variable dimension taking values from the set PE and $R^{CJ}$=PE={$pe_1$, $pe_2$ . . . }. The newly introduced predicate (CJ=$pe_i$) is not added to matrix. As an example to illustrate:

$pe_i$: True AND (B=$b_1$ OR C=$c_1$)⇒
$pe_i$: True AND (B=$b_1$ OR C=$c_1$) AND (CJ=$pe_i$)

The following discussions provides a specific example of transforms applied to extract conjunctive predicates to form a matrix and reduced predicate statements for the following predicate statement set, PE={pe0, pe1, pe2, pe3}, that includes the variables={category, rtb, metro, url_term}:

$pe_0$: (category="iab-51" AND rtb!=4)
$pe_1$: (category="iab-79" AND (metro="new york" OR metro="phoneix" OR rtb=5)
$pe_2$: ((rtb=1 OR rtb=2) AND (url_term="cooking" OR url_term="finance" OR url_term="sports")
$pe_3$: ((metro='sjc' OR metro='slc') AND category !="iab-13" AND category !="iab-80")

The conjunctive predicates present in the original predicate statements are marked as bold above. Applying transform 1 results in the following transformed predicate statements in which conjunctive predicates are bolded:

$pe_0$: (category="iab-51" AND rtb!=4)
$pe_1$: (category="iab-79" AND (metro=["new York","phoneix"] OR rtb=5)
$pe_2$: (rtb=[1,2] AND url_term=["cooking","finance","sports"])
$pe_3$: (metro=['sjc','slc'] AND category !="iab-13" AND category !="iab-80")

Applying transform 2 results in the following transformed predicate statements, in which conjunctive predicates are bolded:

$pe_0$: (category="iab-51" AND rtb!=4)
$pe_1$: (category="iab-79" AND (metro=["new York","phoneix"] OR rtb=5)
$pe_2$: (rtb=[1,2] AND url_term=["cooking","finance","sports"])
$pe_3$: (metro=['sjc','slc'] AND category !=["iab-13","iab-80"])

Applying transform 3 results in the following transformed predicate statements, in which conjunctive predicates are bolded:

$pe_0$: (category="iab-51" AND rtb!=4 AND url_term=Ø AND metro=Ø)
$pe_1$: (category="iab-79" AND (metro=["new York","phoneix"] OR rtb=5) AND url_term=Ø AND rtb=Ø AND metro=Ø)
$pe_2$: (rtb=[1,2] AND url_term=["cooking","finance","sports"] AND metro=ØAND category=Ø)
$pe_3$: (metro=['sjc', 'slc'] AND category !=["iab-13","iab-80"] AND url_term=Ø AND rtb=Ø)

Applying transform 4 results in the following matrix and reduced predicate statements:

| | Matrix | | | |
|---|---|---|---|---|
| | category | rtb | metro | url_term |
| $pe_0$ | category="iab-51" | rtb!=4 | metro=Ø | url_term=Ø |
| $pe_1$ | category="iab-79" | rtb=Ø | metro=Ø | url_term=Ø |

-continued

| Matrix | | | |
|---|---|---|---|
| category | rtb | metro | url_term |
| $pe_2$ category=∅ | rtb=[1,2] | metro=∅ | url_term=["cooking","finance","sports"] |
| $pe_3$ category != ["iab-13","iab-80"] | rtb=∅ | metro=['sjc','slc'] | url_term=∅ |

$pe_0$:(true AND true AND true AND true)
$pe_1$:(true AND (metro=["new York,"phoneix"] OR rtb=5) AND true AND true AND true)
$pe_2$:(true AND true AND true AND true)
$pe_3$:(true AND true AND true AND true)

Applying transform 5 results in the following matrix and reduced predicate statements:

| Example Matrix | | | |
|---|---|---|---|
| category | rtb | metro | url_term |
| $pe_0$ category="iab-51" | rtb!=4 | true | true |
| $pe_1$ category="iab-79" | true | true | true |
| $pe_2$ true | rtb=[1,2] | true | url_term=["cooking","finance","sports"] |
| $pe_3$ category != ["iab-13","iab-80"] | true | metro=['sjc','slc'] | true |

$pe_0$:(CJ = 0)
$pe_1$:(CJ = 1 AND (metro=["new York,"phoneix"] OR rtb=5)
$pe_2$:(CJ = 2)
$pe_3$:(CJ = 3)

Predicate Statement Evaluation

Figure 5:
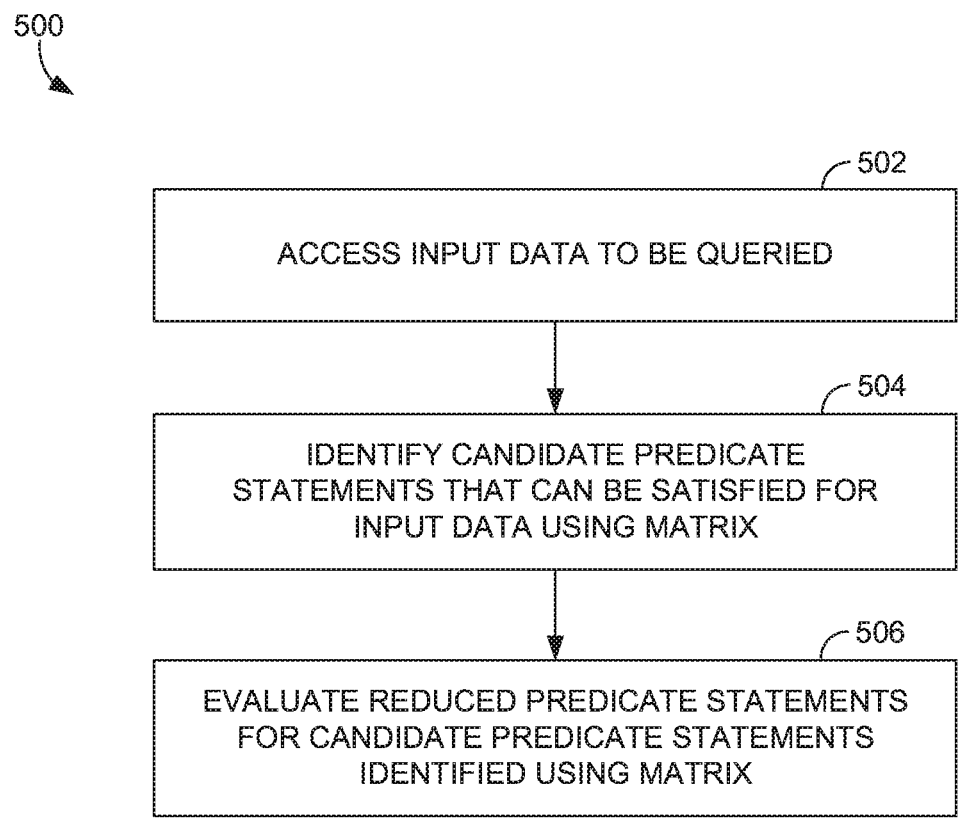
FIG. 5 is a flow diagram showing a method for query processing using a collection of predicate statements in matrix and reduced predicate statement form in accordance with some implementations of the present disclosure.

Referring next to FIG. 5, a flow diagram is provided that illustrates a method 500 for querying input data by evaluating predicate statements using a matrix and reduced predicate statement form for the predicate statements. The method 500 may be performed, for instance, by the evaluation module 106 of FIG. 1. As shown at block 502, input data to be queried is accessed. The input data includes values for any number of variables.

As shown at block 504, candidate predicate statements that can potentially be satisfied by the input data are identified from the matrix. For instance, in cases in which the original predicate statements were placed in CNF, each row in the matrix includes predicates in each column that are conjunctive with each other, such that a predicate statement is identified as a candidate predicate from the matrix when each column is true for the input data. As illustrated in the Example Matrix above, a row for a given predicate statement may have some columns containing a predicate statement, while other columns are marked as true as there is no conjunctive predicate for the variable of each of those columns. For instance, for the predicate statement, $pe_0$, in the Example Matrix, a predicate is identified for the variables "category" and "rtb" while true is indicated for the variables "metro" and "url_term". Thus, the predicate statement $pe_0$ is identified as a candidate predicate statement if the predicates in each of the first two columns are evaluated to true for the input data. Any predicate statements that cannot be satisfied based on the matrix can be removed from further consideration.

The reduced predicate statement for each candidate predicate statement identified from the matrix is evaluated for the input data, as shown at block 506. For each reduced predicate statement that evaluates to true based on the input data, the corresponding predicate statement is marked as true, thereby providing a result set of predicate statements that evaluate to true for the input data.

Exemplary Operating Environment

Figure 6:
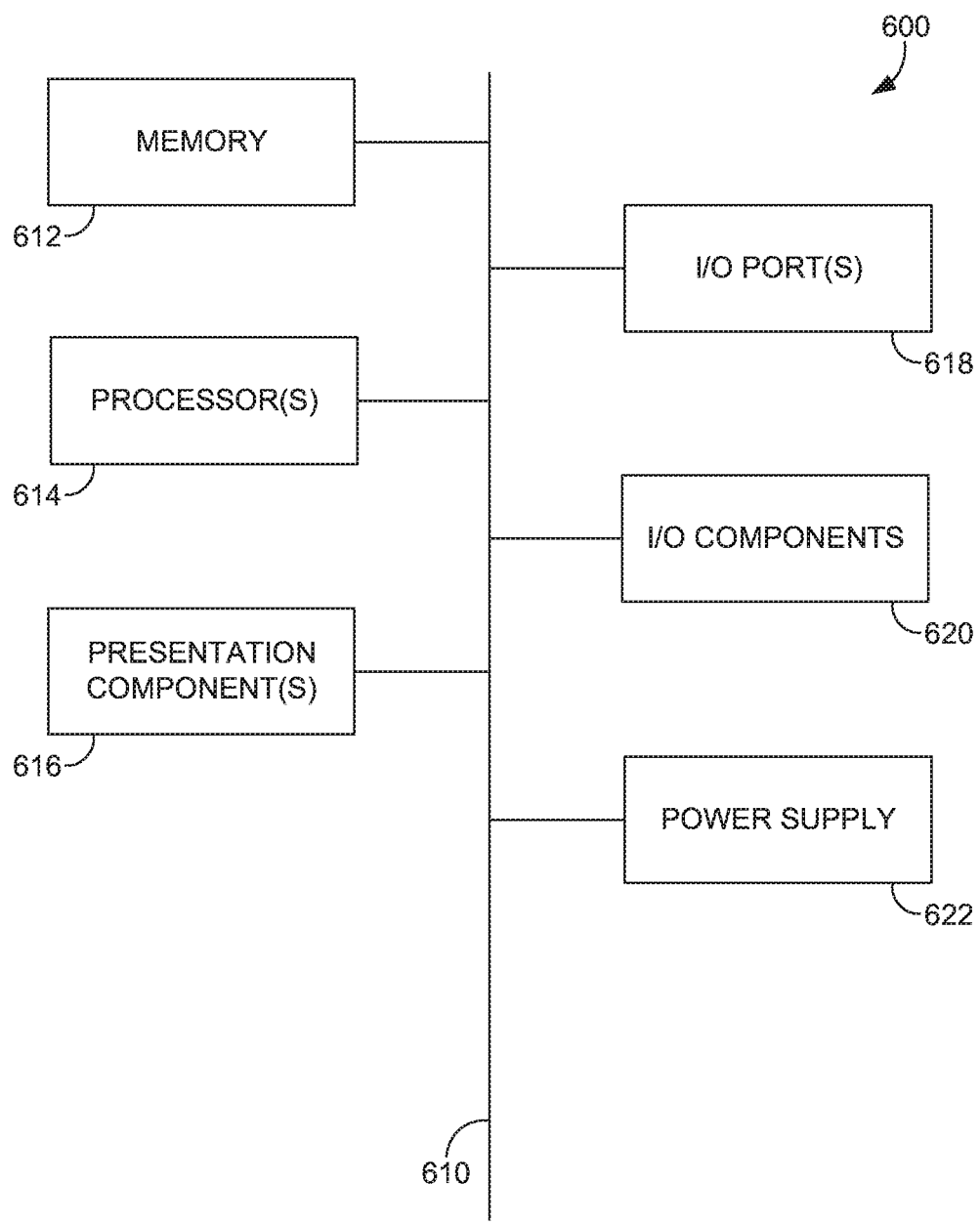
FIG. 6 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion.

The present invention has been described in relation to particular embodiments, which are intended in all respects to be illustrative rather than restrictive. Alternative embodiments will become apparent to those of ordinary skill in the art to which the present invention pertains without departing from its scope.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
   accessing a plurality of predicate statements to be evaluated for querying data;
   generating a set of reduced predicate statements by extracting one or more conjunctive predicates or one or more disjunctive predicates from each predicate statement to provide a corresponding reduced predicate statement for each predicate statement;
   generating a matrix that includes, for each predicate statement, the one or more conjunctive predicates or the one or more disjunctive predicates extracted from the predicate statement;
   storing the set of reduced predicate statements and the matrix on one or more storage devices;
   receiving input data comprising a value for each of one or more variables; and
   evaluating the plurality of predicate statements for the input data using the matrix and the set of reduced predicate statements.

2. The one or more computer storage media of claim 1, wherein the operations further comprise performing one or more preprocessing operations on one or more predicate statements from the plurality of predicate statements.

3. The one or more computer storage media of claim 2, wherein the one or more preprocessing operations comprise:
converting the one or more predicate statements to conjunctive normal form or disjunctive normal form.

4. The one or more computer storage media of claim 2, wherein the one or more preprocessing operations comprise:
generating a tree expression for each predicate statement.

5. The one or more computer storage media of claim 1, wherein the reduced predicate statements and matrix are generated by:
applying one or more transforms to at least a portion of the predicate statements.

6. The one or more computer storage media of claim 5, wherein applying the one or more transforms comprises:
identifying a first predicate statement that includes multiple disjunctions for a first variable; and
consolidating the multiple disjunctions as a single predicate and removing the multiple disjunctions from the first predicate statement.

7. The one or more computer storage media of claim 5, wherein applying the one or more transforms comprises:
identifying a first predicate statement that includes multiple predicates for a first variable that include an inequality operator; and
consolidating the multiple predicates as a single predicate with an inequality operator.

8. The one or more computer storage media of claim 5, wherein applying the one or more transforms comprises:
identifying a first predicate statement that does not have a conjunctive predicate for a first variable; and
augmenting the first predicate statement with a conjunctive predicate for the first variable that includes an equality operator and a phantom value.

9. The one or more computer storage media of claim 1, wherein generating the matrix comprises:
adding, for each predicate statement, a true value to the matrix for any variable not having a conjunctive predicate or a disjunctive predicate in the predicate statement.

10. The one or more computer storage media of claim 1, wherein the matrix comprises a table in which each row corresponds with a predicate statement from the plurality of predicate statements and each column corresponds with a variable from a plurality of variables included in the plurality of predicate statements.

11. The one or more computer storage media of claim 1, wherein evaluating the plurality of predicate statements for the input data comprises:
identifying one or more candidate predicate statements that can be satisfied for the input data using the matrix; and
evaluating the reduced predicate statement for the input data for each of the one or more candidate predicate statements.

12. A computerized method for querying input data, the method comprising:
applying one or more transforms to a plurality of predicate statements to generate a matrix and a set of reduced predicate statements, the matrix including one or more conjunctive predicates or one or more disjunctive predicates from each predicate statement from the plurality of predicate statements, the set of reduced predicate statements including a reduced predicate statement generated for each predicate statement by removing the one or more conjunctive predicates or the one or more disjunctive predicates;
receiving input data comprising a value for each of one or more variables; and
evaluating the plurality of predicate statements for the input data using the matrix and the set of reduced predicate statements.

13. The computerized method of claim 12, wherein the method further comprises converting each of at least a portion of the predicate statements to conjunctive normal form or disjunctive normal form.

14. The computerized method of claim 12, wherein applying the one or more transforms comprises:
identifying a first predicate statement that includes multiple disjunctions for a first variable; and
consolidating the multiple disjunctions as a single predicate and removing the multiple disjunctions from the first predicate statement.

15. The computerized method of claim 12, applying the one or more transforms comprises:
identifying a first predicate statement that includes multiple predicates for a first variable that include an inequality operator; and
consolidating the multiple predicates as a single predicate with an inequality operator.

16. The computerized method of claim 12, wherein applying the one or more transforms comprises:
identifying a first predicate statement that does not have a conjunctive predicate for a first variable; and
augmenting the first predicate statement with a conjunctive predicate for the first variable that includes an equality operator and a phantom value.

17. The computerized method of claim 12, wherein generating the matrix comprises:
adding, for each predicate statement, a true value to the matrix for any variable not having a conjunctive predicate or a disjunctive predicate in the predicate statement.

18. The computerized method of claim 12, wherein evaluating the plurality of predicate statements for the input data comprises:
identifying one or more candidate predicate statements that can be satisfied for the input data using the matrix; and
evaluating the reduced predicate statement for the input data for each of the one or more candidate predicate statements.

19. A computer system comprising:
one or more processors; and
one or more computer storage media storing computer-useable instructions that, when used by the one or more processors, cause the one or more processors to perform operations comprising:
applying one or more transforms to a plurality of predicate statements to generate a matrix and a set of reduced predicate statements, the matrix including one or more conjunctive predicates or one or more disjunctive predicates from each predicate statement from the plurality of predicate statements, the set of reduced predicate statements including a reduced predicate statement generated for each predicate statement by removing the one or more conjunctive predicates or the one or more disjunctive predicates;
receiving input data comprising a value for each of one or more variables; and evaluating the plurality of predicate statements for the input data using the matrix and the set of reduced predicate statements.

\* \* \* \* \*